United States Patent [19]

Stinson

[11] Patent Number: 5,014,758

[45] Date of Patent: May 14, 1991

[54] PROTECTIVE COVER FOR VEHICLE WINDOWS

[76] Inventor: Charles W. Stinson, 506 Spencer St., Ruston, La. 71270

[21] Appl. No.: 477,556

[22] Filed: Feb. 9, 1990

[51] Int. Cl.$^5$ .................................................. B60J 11/00
[52] U.S. Cl. ................................. 150/168; 160/370.2; 296/95.1
[58] Field of Search .......................... 150/166–168; 296/95.1, 136; 160/370.2

[56] References Cited

U.S. PATENT DOCUMENTS

| | | | |
|---|---|---|---|
| 1,462,545 | 7/1923 | Higgin | 160/370.2 X |
| 2,646,118 | 7/1953 | Berty | 296/95.1 X |
| 2,738,475 | 3/1956 | Beach | 220/242 X |
| 2,823,746 | 2/1958 | Morgan | 296/95.1 X |
| 2,849,012 | 8/1958 | Cohen et al. | 296/95.1 X |
| 2,934,591 | 4/1960 | Tiikkainen | 220/242 X |
| 2,979,129 | 4/1961 | Ketchum | 160/370.2 |
| 2,987,690 | 6/1961 | Marbais | 220/3.94 X |
| 3,123,394 | 3/1964 | Corsetti | 296/95.1 |
| 3,338,293 | 8/1967 | Hohmann | 296/95.1 X |
| 4,049,036 | 9/1977 | Gebhardt | 150/168 |
| 4,181,350 | 1/1980 | Eichstaedt | 150/168 |
| 4,209,197 | 6/1980 | Fischer | 150/166 X |
| 4,376,546 | 3/1983 | Guccione et al. | 280/770 |
| 4,406,320 | 9/1983 | Bingham | 160/370.2 |
| 4,589,459 | 5/1986 | Lantrip | 296/136 X |
| 4,607,136 | 8/1986 | Thomas | 220/242 |
| 4,799,728 | 1/1989 | Akers et al. | 296/95.1 X |
| 4,821,785 | 4/1989 | Rolan | 150/166 |
| 4,862,943 | 9/1989 | Shafia | 296/95.1 X |
| 4,863,210 | 9/1989 | Kenon | 296/136 |
| 4,867,216 | 9/1989 | McKee | 150/166 |

FOREIGN PATENT DOCUMENTS

| | | | |
|---|---|---|---|
| 256437 | 1/1965 | Australia | 296/95.1 |
| 493935 | 7/1976 | Australia | 296/95.1 |
| 751821 | 1/1967 | Canada | 296/95.1 |
| 1200574 | 2/1986 | Canada | 296/136 |
| 2755263 | 6/1979 | Fed. Rep. of Germany | 296/136 |
| 1332703 | 6/1963 | France | 296/95.1 |
| 1424528 | 12/1965 | France | 296/95.1 |
| 1290862 | 9/1972 | United Kingdom | 296/95.1 |

Primary Examiner—Sue A. Weaver
Attorney, Agent, or Firm—John M. Harrison

[57] ABSTRACT

A protective cover for vehicle windows which includes a length of flexible sheet material having a first retainer clamp provided on one end for removable attachment to one of the front door posts of a vehicle, three additional retainer clamps adapted for engaging the sheet material in spaced relationship with respect to the first cover clamp and attachment to the remaining front door post and the rear window posts of the vehicle and a leading edge member attached to the opposite end of the sheet material for removably engaging the first cover retainer clamp to secure the sheet material over the windshield, rear window and side windows of the vehicle. In a preferred embodiment a rubber seal is provided at the top edge of the cover sheet and clamp retainers are attached to the cover retainer clamps, to further secure the protective cover on the vehicle and minimize theft of the protective cover. Grommets may also be provided in spaced relationship in the bottom edge of the protective cover for further securing the protective cover on the vehicle.

17 Claims, 2 Drawing Sheets

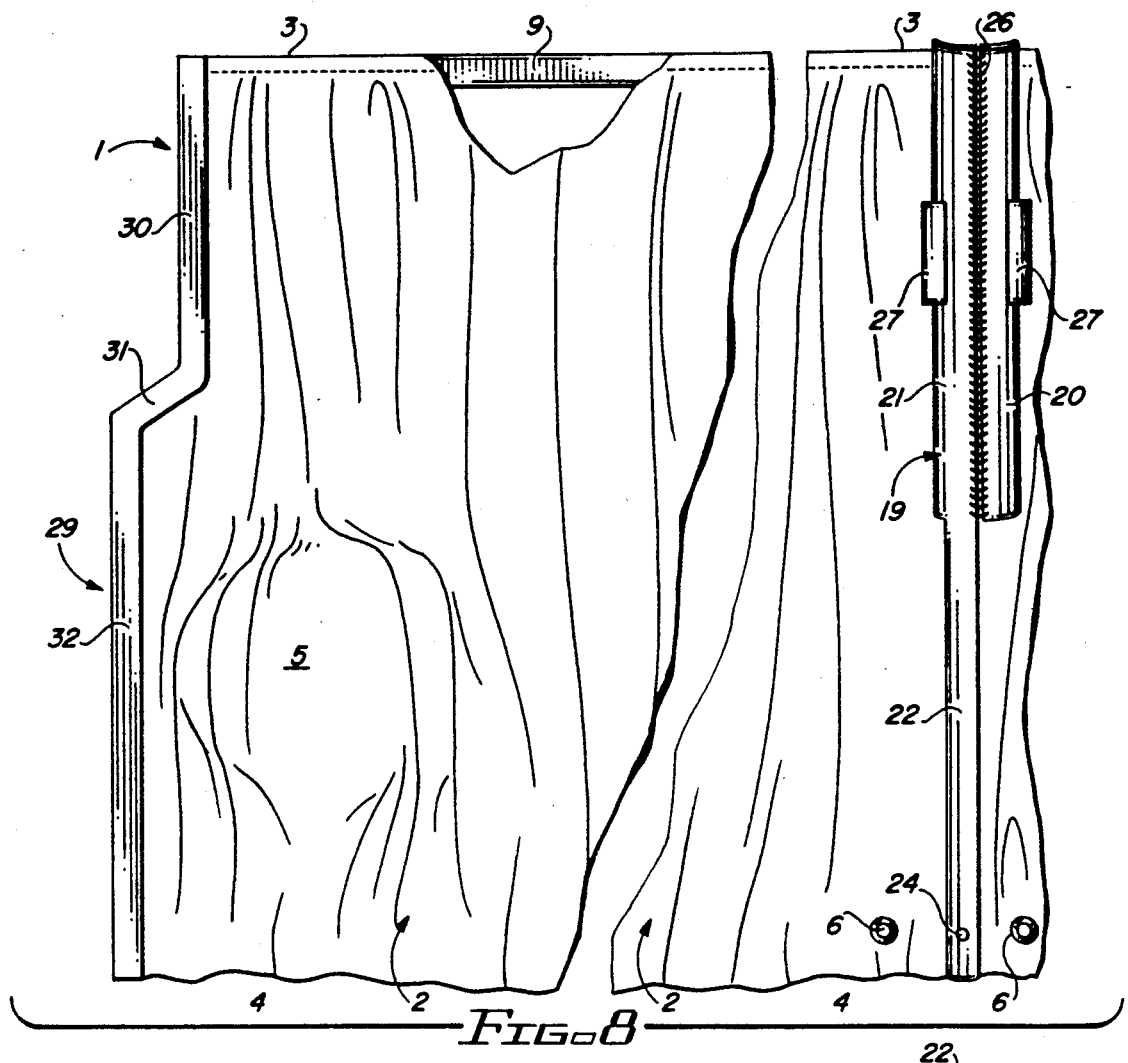
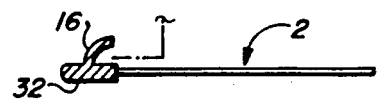
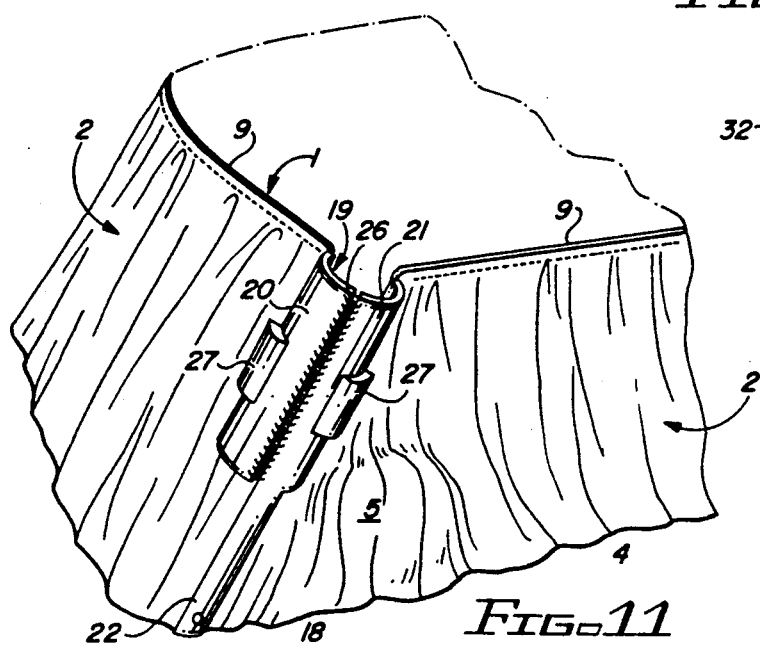
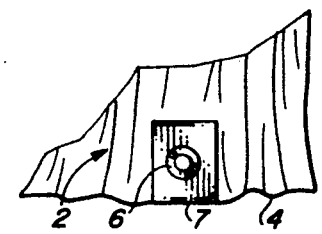

PROTECTIVE COVER FOR VEHICLE WINDOWS

BACKGROUND OF THE INVENTION

1. Field of the Invention

This invention relates to protective covers for vehicles and more particularly, to a protective cover for vehicle windows, which protective cover is characterized by a length of resilient, protective sheet material having a first cover retainer clamp removably and adjustably secured to one edge thereof and adapted for removable attachment to one of the front door posts of the vehicle, three additional cover retainer clamps designed to engage the protective sheet material in spaced relationship for securing the sheet material to the remaining front door post and the rear window posts, respectively, of the vehicle and a leading edge member attached to the opposite edge of the protective sheet for removably engaging the first cover retainer clamp and securing the protective cover over the windshield, rear window and side windows of the vehicle. The protective cover is typically constructed of a polyethylene, polypropylene, "Mylar" or alternative plastic sheet material and may be provided with a rubber strip which acts as a seal at the top edge and grommets located in spaced relationship at the bottom edge, for further securing the protective cover to the vehicle. Clamp retainers may also be attached to each of the cover retainer clamps for insertion between the front doors and the front door posts and the rear doors and rear window posts or the side windows and closing inside the vehicle, in order to provide a measure of security against theft for the protective cover. In a preferred embodiment, the cover retainer clamps are each characterized by curved clamp members or panels joined longitudinally by a spring for removably clamping to the front door and rear window posts of a vehicle, respectively, and securing the protective cover in place over the windshield, rear window and side windows. In a preferred embodiment handles are provided in the hinged panels of the cover retainer clamps to facilitate manipulation of the spring-loaded panels for securing and removing the cover retainer clamps to and from the cover sheet and the door and window posts of the vehicle. For the purposes of this invention the front door posts of a vehicle are considered to be those structural members extending between the frame and the roof above the front door hinges and separating the doors from the windshield. The rear window posts are similar structural members located at the rear of the vehicle and serve to separate the rear doors or side windows from the rear or back window.

One of the problems which exists in maintaining cars in areas where ice and snow are frequent occurences, is that of clearing the ice and snow from the windshield, rear window and side windows of a vehicle at low temperatures. Techniques for achieving this end include the use of scrapers, petroleum based aerosol canisters and placing towels, cardboard, plastic and other material over the windshield, as well as other measures. Under circumstances where the temperature is very low and the accumulation of snow and ice is significant, it is very difficult to remove all of the ice and snow from the windows in a short time such that the driver is able to clearly observe traffic ahead, behind and to each side of his vehicle. The use of built-in heating devices such as heater elements, defroster systems and the like, is dependent upon the warm-up time of the vehicle and adds to the delay in clearing the windows. Accordingly, there is a need for a protective device for vehicle windows which can be quickly and easily installed and removed on the windshield, rear window and side windows to protect those windows from the accumulation of ice and snow, as well as other materials, including tree sap or resin, dust and the like.

2. Description of the Prior Art

Various devices are known in the art for protecting vehicles and vehicle windows from the accumulation of insects, ice and snow. A "Vehicle Front End Shield" is detailed in U.S. Pat. No. 4,376,546, dated March 15, 1983, to Leo A. Guccione. The front end shield is rigid and includes a peripheral soft, resilient tube mounted around the underside of the vehicle to space the planar part of the shield from the surface of the vehicle. A pair of headlight covers are attached to the retractable headlight mechanisms to complete the front end coverage and the shield may be constructed either of a single piece or in two halves, to permit easy storage. U.S. Pat. No. 4,589,459, dated May 20, 1986, to Larry J. Lantrip, details a "Vehicle Protective Cover". The cover includes a front portion having a front panel, a hood panel and front side panels. The hood panel and front side panels are adapted for detachable connection along the outside edge of the hood panel, thus providing essentially continuous coverage of the hood and lower front side walls of the vehicle. The front side panels extend rearwardly beyond the rear edge of the vehicle doors to overlap the rear portion of the cover. The rear portion of the protective cover includes rear side panels which extend down the rear exterior side walls of the vehicle. The rear side panels are preferably connected at the rear and provided with adjustments so that they can be drawn taunt against the vehicle. A protective cover is detailed in U.S. Pat. No. 4,821,785, dated April 18, 1989, to Rolan. The cover is designed to cover a shaped object such as an automobile to protect the object from the environment and includes multiple panels of lightweight, impermeable sheet material having the edges joined to form an enclosure. The sheet material is preferably a laminate of a film of reflective metal disposed between an outer layer of transparent resin such as Mylar or polyethylene and an inner layer of resin, preferably color-coded. The laminate may optionally contain a layer of scrim reinforcement. Water trapped between the cover and the surface of the object is selectively exhausted by means of vents having a flap which opens in response to gas pressure developed on evaporation of the trap water vapor. The flap normally remains closed to prevent entry of rain, dust, sap or other substances harmful to the finish of the automobile stored under the cover.

It is an object of this invention to provide a protective cover for vehicle windows, which cover is characterized by a lightweight film or cover sheet of sufficient length to encircle the windshield, side windows and rear or back window of a vehicle and four or more clamp members designed to engage the cover sheet and the front door posts and rear window posts in spaced relationship, respectively, for removably securing the protective cover sheet to the front door posts and rear window posts of the vehicle.

Another object of the invention is to provide a protective cover for removable installation over the windshield, rear window and side windows of a vehicle to protect the windows from accumulation of ice, snow, resin or sap and the like, which protective cover includes a length of resilient cover sheet material which is sufficiently wide and long to encircle and cover the windshield, back window and side windows of the vehicle and four clamp members for engaging the cover sheet material in spaced relationship, clamping the cover sheet material to the front door and window posts of the vehicle and securing the protective cover on the vehicle.

Another object of this invention is to provide a resilient protective cover for vehicle windows, which protective cover includes four hinged retainer clamps adapted for engaging a length of cover sheet material in spaced relationship, which cover sheet material is sufficiently wide to cover the windshield, rear window and side windows of a vehicle, wherein the clamps are removably secured to the cover sheet material and the underlying front door posts and rear window posts of the vehicle, respectively, to mount segments of the cover sheet material over the windshield, rear or back window and side windows of the vehicle and prevent the accumulation of ice, snow, resin or sap and the like on the windshield, rear window and side windows.

SUMMARY OF THE INVENTION

These and other objects of the invention are provided in a protective cover for vehicle windows, which protective cover includes a length of resilient, flexible sheet material such as polyethylene, Mylar or the like, that is sufficiently long and wide to extend around and cover the windshield, side windows and rear windows of a vehicle and four retainer clamps adapted for engaging the sheet material in spaced relationship and removably securing the sheet material to the front door posts and rear window posts of the vehicle. In a preferred embodiment the clamps are spring-loaded for removably engaging the front door and rear window posts, the sheet material is connected at one edge to one of the clamps and is provided with a rubber seal around the top edge thereof for sealing the protective cover against the vehicle roof immediately above the windshield, rear window and side windows, respectively, and grommets are spaced along the bottom edge of the sheet material for accepting ties and securing the bottom edge to the vehicle.

BRIEF DESCRIPTION OF THE DRAWINGS

The invention will be better understood by reference to the accompanying drawings, wherein:

FIG. 6 is a sectional view taken along line 6—6 of a panel leg element of the cover retainer clamp illustrated in FIG. 2, more particularly illustrating a leg hook attached thereto;

FIG. 8 is a side view, partially in section, of the leading edge and cover retainer clamp elements of the protective cover of this invention;

FIG. 9 is a sectional view taken along line 9—9 of the leading edge element illustrated in FIG. 8, more particularly illustrating a cover hook designed to engage the corresponding leg hook illustrated in FIG. 6;

FIG. 10 is a bottom sectional detail of a typical grommet provided in the cover sheet for attaching the bottom edge of the cover sheet to the vehicle; and FIG. 11 is a perspective view, partially in section, more particularly illustrating a typical installation of a cover retainer clamp and a portion of the cover sheet element of the protective cover to a front door post of a vehicle.

DESCRIPTION OF THE PREFERRED EMBODIMENTS

Figure 1:
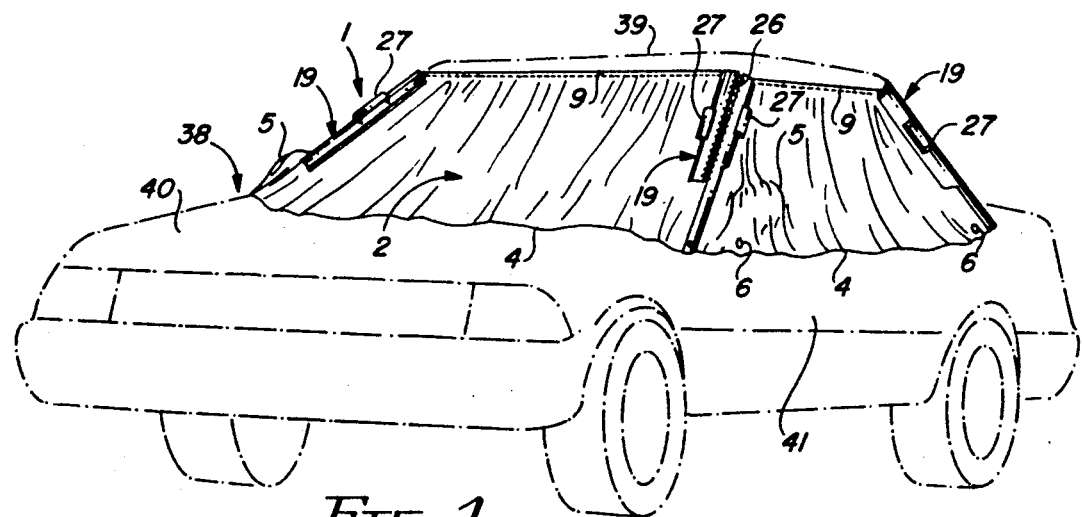
FIG. 1 is a perspective view of a preferred embodiment of the protective cover of this invention secured to an automobile in functional configuration.

Referring initially to FIGS. 1-5 of the drawings, the protective cover of this invention is generally illustrated by reference numeral 1 and includes a resilient, flexible cover sheet constructed of a thin, strong material such as polyethylene, polypropylene, "Mylar" or the like and provided with four curved cover retainer clamps 19, which are shaped for engaging and securing the cover sheet 2 to the front door posts and rear window posts (not illustrated of the vehicle 38, in spaced relationship. As illustrated in FIG. 1, the cover retainer clamps 19 are each designed to removably engage the front door posts and rear window posts, in order to secure the cover sheet 2 over the windshield, side windows and rear window, respectively, of the vehicle 38. When the protective cover 1 is in functional configuration on the vehicle 38 as illustrated in FIGURE 1, it is understood that the top margin 3 is secured against the perimeter of the top molding or trim (not illustrated) or the vehicle top 39, while the bottom margin 4 lies adjacent to the hood 40, doors 41 (one of which is illustrated in FIG. 1) and the trunk not illustrated, respectively, of the vehicle 38.

Figures 2, 3, 4:
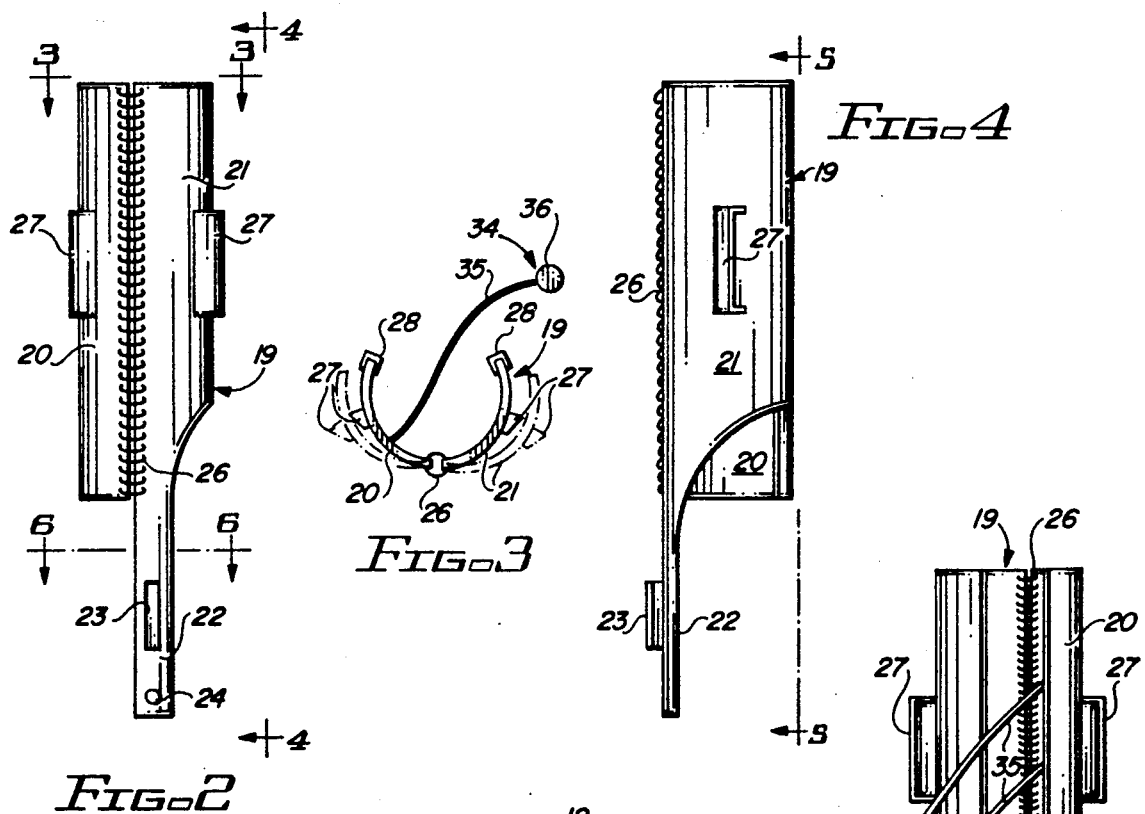
FIG. 2 is a rear view of a typical spring-loaded cover retainer clamp for retaining the protective cover illustrated in FIG. 1 to the front door post or rear window post of the vehicle.
FIG. 3 is a top view of the cover retainer clamp illustrated in FIG. 2, more particularly illustrating a clamp retainer provided thereon.
FIG. 4 is a left side view of the cover retainer clamp illustrated in FIGS. 2 and 3.
Figures 5, 7:
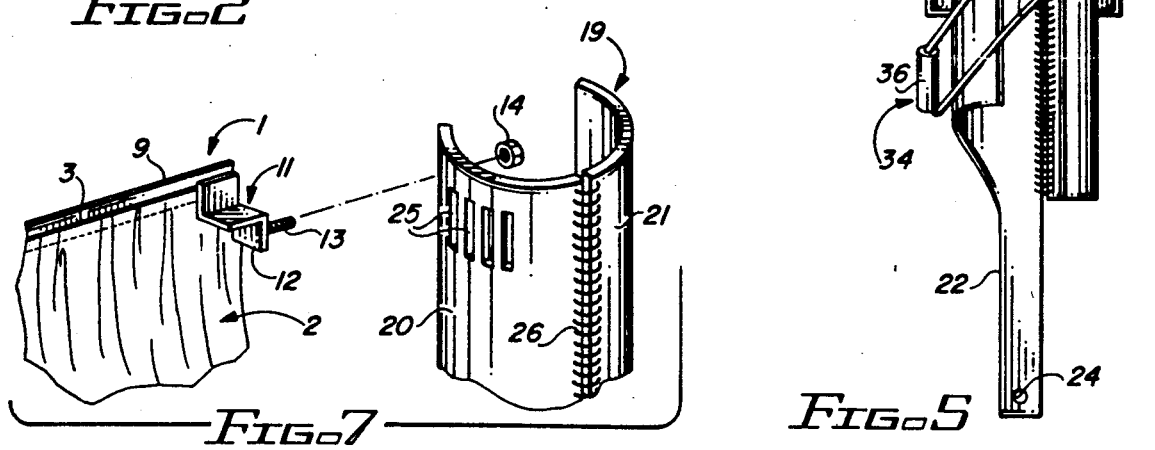
FIG. 5 is a front view of the cover retainer clamp illustrated in FIGS. 2-4, more particularly illustrating the clamp retainer illustrated in FIG. 3.
FIG. 7 is a perspective view, partially in section, of the top end of the cover retainer clamp illustrated in FIG. 2, illustrating a preferred technique for attaching a top portion of the trailing edge of the cover sheet member to the cover retainer clamp.

Referring now to FIGS. 2-7 of the drawings, the cover retainer clamps 19 are each characterized in a preferred embodiment by a curved inside clamp panel 20 and a curved outside clamp panel 21, the latter having a downwardly-extending panel leg 22, which inside clamp panel 20 is connected to the outside clamp panel 21 by means of an elongated spring 26. The spring 26 may be secured to the facing edges of the inside clamp panel 20 and outside clamp panel 21 in any desired manner, according to the knowledge of those skilled in the art, such that the inside clamp panel 20 and outside clamp panel 21 may be opened against the bias of the spring 26, as hereinafter further described. Handles 27 are also provided on the inside clamp panel 20 and the outside clamp panel 21 to facilitate manipulating the outside engaging edges of the inside clamp panel 20 and outside clamp panel 21 outwardly against the bias in the spring 26, as illustrated in phantom in FIG. 3, in order to engage the cover sheet 2 and an underlying front door post or rear window post of the vehicle and secure the cover retainer clamp 2 and the underlying cover sheet 2 to the front door post or rear window post. Optional rubber or alternative high friction panel strips 28 may be provided on the engaging edges of the inside clamp panel 20 and the outside clamp panel 21 as illustrated in FIG. 3, to increase the gripping effect of the cover retainer clamp 19, as desired. As illustrated in FIGS. 3 and 5, a clamp retainer 34 extends from the inside clamp panel 20 of each cover retainer clamp 19, to minimize the opportunity for theft of the protective cover 1. In a preferred embodiment the clamp retainer 34 is characterized by a pair of spaced retainer straps 35, which may be constructed of nylon cord or other material, connected at the base end to the inside clamp panel 20 and at the extending ends by a strap connector 36, such that the strap connector 36 and a portion of the retainer straps 35 can be retained inside the vehicle 38 by opening the door 41 and retracting the side windows (not illustrated), inserting the strap connectors 36 and closing the door 41 and side windows on the retainer straps 35.

Referring now to FIGS. 1 and 7 of the drawings, in another preferred embodiment of the invention the cover retainer clamp 19 which is installed on the driver's front door post of the vehicle 38 is characterized by multiple, vertically-oriented, horizontally spaced panel slots 25, for receiving a threaded pin 13. The pin 13 extends from the cleat 12 of a cover fitting 11, which is attached to the top trailing edge of the cover sheet 2, for adjustably securing the trailing end of the cover sheet 2 to the inside clamp panel 20 of the cover retainer clamp 19. A nut 14 threadably engages the threaded pin 13 after the threaded pin 13 is extended through a selected one of the panel slots 25, in order to removably and vertically adjustably attach the cover fitting 11 to the inside clamp panel 20. In another preferred embodiment of the invention a rubber seal 9 is provided along the top edge of the cover sheet 2 as illustrated in FIGS. 1 and 7, in order to seal the top edge of the cover sheet 2 to the weather stripping, molding or trim (not illustrated) or to the periphery of the top 39 of the vehicle 38.

Referring now to FIGS. 8 and 10 of the drawings, the opposite, or leading edge of the cover sheet 2 is fitted with a Z-shaped leading edge member 29, characterized by a top leg 30, an offset connector 31 and a bottom leg 32. As illustrated in FIG. 9, the bottom portion of the bottom leg 32 is fitted with an inwardly-extending cover hook 16, which is designed to removably engage a corresponding leg hook 23 extending in the opposite direction from the panel leg 22, as illustrated in FIGS. 2 and 6 and as hereinafter further described.

Referring now to FIGS. 1, 3, 7, 8 and 11 of the drawings, the protective cover 1 is installed on a vehicle 38 as follows. A first cover retainer clamp 19, which is specifically designed for installation on the driver's front door post of the vehicle 38, is initially grasped by the handles 27 and is opened against the bias of the spring 26 into the configuration illustrated in phantom in FIG. 3, for engaging the driver's front door post (not illustrated of the vehicle 38, as illustrated in FIGS. 1 and 11. The bias in the spring 26 closes the outside edges of the inside clamp panel 20 and the outside clamp panel 21 against the driver's front door post to secure the cover retainer clamp 19 in position. The trailing edge of the cover sheet 2 which is fitted with the cover fitting 11, is then secured to the inside clamp panel 20 of the cover retainer clamp 19, by extending the corresponding threaded pin 13 through an appropriate one of the panel slots 25 and engaging the nut 14 on the threaded pin 13 to secure the top trailing edge of the cover sheet 2 to the cover retainer clamp 19. The remainder of the trailing edge of the cover sheet 2 is tucked beneath the spring-loaded inside clamp panel 20, as illustrated in FIGS. 1, 8 and 11. It will be appreciated by those skilled in the art that the rubber seal 9 extending along the top edge of the cover sheet 2, can be thusly adjusted upwardly or downwardly in the selected one of the panel slots 25, in order to insure that the rubber seal 9 is fitted tightly against the weather stripping, molding or trim or against the vehicle top above the side window of the vehicle 38, as necessary, depending upon the specific design of the vehicle 38. When the trailing edge of the cover sheet 2 is thusly secured to the first cover retainer clamp 19 as illustrated in FIGS. 1, 8 and 11, the cover sheet 2 is then wrapped over the windshield to the adjoining passenger side front door post not illustrated), where a second cover retainer clamp 19 is positioned over the cover sheet 2 and secured to the passenger front door post in the same manner as the cover retainer clamp 19 installed on the driver's front door post. The cover sheet 2 is then extended around the passenger's window, with the mirror bubble 5 positioned over the passenger outside mirror (not illustrated) and the rubber seal 9 is located along the weather stripping, molding or trim or along the outer perimeter of the vehicle top 39, where a third cover retainer clamp 19 is installed on the right rear window post (not illustrated) of the vehicle 38, over the cover sheet 2, in the same manner as the driver and passenger front door post cover retainer clamps 19. The cover sheet 2 is then extended across the rear window, with the rubber seal 9 again maintained at or near the top perimeter of the vehicle top 39, where a fourth cover retainer clamp 19 is attached to the left rear window post (not illustrated) of the vehicle 38. The cover sheet 2 is then further extended around the driver's side windows with the rubber seal 9 located on or near the top perimeter of the vehicle top 39, the second mirror bubble 5 positioned over the driver's outside mirror (not illustrated) and the leading edge member 29 is then fitted beneath the outside clamp panel 21 of the driver's front door post cover retainer clamp 19, by seating the top leg 30 of the leading edge member 29 beneath the inside clamp panel 20 of the cover retainer clamp 19 and securing the leading edge member 29 in closed position, by operation of the bias in the spring 26. The bottom leg 32 is then secured to the panel leg 22 of the cover retainer clamp 19 by lapping the cover hook 16, attached to the bottom leg 32, over the corresponding leg hook 23, attached to the panel leg 22, and engaging the cover hook 16 and the leg hook 23, as illustrated in FIGS. 2, 6 and 9. Since the leading edge member 29 is Z-shaped as illustrated in FIG. 8, the top leg 30 may be sandwiched beneath the outside clamp panel 21 of the cover retainer clamp 19, while the bottom leg 32 extends from beneath the outside clamp panel 21 over the panel leg 22 to facilitate engagement of the cover hook 16 and the corresponding leg hook 23. As illustrated in FIGS. 1, 8 and 10, grommets 6 may be sewn or otherwise secured to the bottom edge of the cover sheet 2 by means of felt strips 7, to accommodate ties (not illustrated}and secure the bottom edge of the cover sheet 2 to the vehicle 38 in the event of high wind. Furthermore, a panel leg opening 24 is provided in each panel leg 22 for also receiving a tie and further securing the cover sheet 2 to the vehicle 38.

It will be appreciated by those skilled in the art that the protective cover for vehicle windows of this invention constitutes an efficient, easily applied and easily removed protective device for preventing the accumulation of ice, snow, resin or sap and other materials, including pollen, dust and the like on the windshield, rear windows and side windows of a vehicle. Referring again to the drawings, the protective cover 1 can be designed to fit substantially any vehicle, including two-door automobiles and trucks such as pickup trucks, since the cover sheet 2 is resilient, being constructed of vinyl, Mylar or the like and the rubber seal 9 can be stretched to fit tightly against the top molding or trim, as well as the roof perimeter of vehicles which are varied in design. Accordingly, it will be appreciated that the protective cover 1 can be designed to fit both large and small cars, wherein the cover sheet 2 lies between the respective front door posts and rear window posts, flat against the windshield, rear window and side windows, respectively. Since the object of the invention is to provide a protective cover which will prevent, or at least minimize, the accumulation of ice, snow, resin or gum and the like on the windshield, rear window and side windows of the vehicle, it is necessary that the cover sheet 2 completely cover the windshield, rear window and side windows, respectively, as the cover retainer clamps are aligned with and secured to the respective front door posts and rear window posts, respectively, regardless of the size of the vehicle covered. Consequently, when the windshield and windows of smaller cars are covered by the protective cover 1, a fold can be made in the cover sheet 2 at the leading edge member 29 to take up the slack in the cover sheet 2 and the fold tucked beneath the outside clamp panel 21 of the driver front door post when the leading edge member 29 is secured to the corresponding cover retainer clamp 19, as illustrated in FIG. 11.

It will be appreciated by those skilled in the art that the cover retainer clamps 19 may be provided in any number to accommodate the front door posts and rear window posts of vehicles such as station wagons and vans, for example, and may be constructed in one piece, of resilient material such as PVC pipe which is split longitudinally, and like materials, without using the coiled spring 26. The natural resiliency of the PVC pipe operates to hold the cover sheet 2 on the respective front door posts and rear window posts of the vehicle 38. Other bias mechanisms may also be used in lieu of the coiled spring 26 to bias the inside clamp panel 20 and outside clamp panel 21 against the cover sheet 2 and the front door posts and rear window posts, respectively, of the vehicle, further according to the knowledge of those skilled in the art. Moreover, it will be further appreciated that a length of cover sheet which is characterized by a single or multiple plies or lamina of "Mylar", polyethylene or the like, and is sufficiently long to encircle the vehicle and wide enough to cover the windshield and windows can be attached to the front door posts and rear window posts by the cover retainer clamps 19, with no attachment of the trailing edge of the cover sheet 2 to any of the cover retainer clamps 19. Additionally, referring again to FIG. 1, the panel legs 22 of the retainer clamps 19 allow the cover sheet 2 to extend downwardly and cover the windshield wipers and well, as well as the door handles and locks. Accordingly, while the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A protective cover for the windshield and windows of a vehicle having front door posts and rear window posts, comprising a flexible cover sheet for covering the windshield and windows and at least one clamp comprising an inside clamp panel and an outside clamp panel for removably securing said cover sheet to the front door posts and rear window posts respectively, and bias means connecting said inside clamp panel to said outside clamp panel for biasing said inside clamp panel and said outside clamp panel against said cover sheet and the front door posts and rear window posts respectively, and removably positioning said cover sheet over the windshield and windows of the vehicle.

2. The protective cover of claim 1 further comprising sealing means provided on the top edge of said cover sheet for engaging the vehicle and removably sealing said cover sheet over the windshield and windows.

3. The protective cover of claim 1 wherein the vehicle is equipped with at least one outside mirror and further comprising at least one bubble provided in said cover sheet for accommodating the outside mirror when said protective cover is placed on the vehicle.

4. The protective cover of claim 1 wherein the vehicle is equipped with at least one outside mirror and further comprising:
   (a) sealing means provided on the top edge of said cover sheet for engaging the vehicle and removably sealing said cover sheet over the windshield and windows; and
   (b) at least one bubble provided in said cover sheet for accommodating the outside mirror when said protective cover is placed on the vehicle.

5. The protective cover of claim 1 further comprising connecting means provided on one end of said cover sheet and receptacle means provided on said inside clamp panel of said at least one clamp for removably receiving said connecting means and removably joining said one end of said cover sheet to said inside clamp panel.

6. The protective cover of claim 1 further comprising a sealing member provided on the top edge of said cover sheet for engaging the vehicle and removably sealing said cover sheet over the windshield and windows.

7. The protective cover of claim 5 wherein the vehicle is equipped with at least one outside mirror and further comprising at least one bubble provided in said cover sheet for accommodating the outside mirror when said protective cover is placed on the vehicle.

8. The protective cover of claim 1 wherein the vehicle is equipped with at least one outside mirror and further comprising:
   (a) a sealing member provided on the top edge of said cover sheet for engaging the vehicle and removably sealing said cover sheet over the windshield and windows; and
   (b) at least one bubble provided in said cover sheet for accommodating the outside mirror when said protective cover is placed on the vehicle.

9. The protective cover of claim 8 further comprising connecting means provided on one end of said cover sheet and receptacle means provided on said inside clamp panel of said at least one clamp for removably receiving said connecting means and removably joining said one end of said cover sheet to said inside clamp panel.

10. The protective cover of claim 1 further comprising clamp retainer means carried by said inside panel clamp said clamp retainer means adapted for extending into the vehicle as a security device.

11. The protective cover of claim 10 wherein the vehicle is equipped with at least one outside mirror and further comprising:
(a) a resilient sealing strip provided on the top edge of said cover sheet for engaging the vehicle and sealing said cover sheet on the windshield and windows; and
(b) at least one bubble provided in said cover sheet for accommodating the outside mirror when said protective cover is placed on the vehicle.

12. The protective cover of claim 1 further comprising at least one tie-receiving means provided on said cover sheet for securing the bottom edge of aid cover sheet to the vehicle.

13. The protective cover of claim 12 wherein said tie-receiving means further comprises a plurality of spaced grommets and the vehicle is equipped with at least one outside mirror and further comprising:
(a) a rubber strip provided on the top edge of said cover sheet for engaging the vehicle and sealing said cover sheet over the windshield and windows; and
(b) at least one bubble provided in said cover sheet for accommodating the outside mirror when said protective cover is placed on the vehicle.

14. The protective cover of claim 13 further comprising clamp retainer means carried by said inside clamp panel said clamp retainer means adapted for extending into the vehicle as a security device.

15. The protective cover of claim 14 wherein said bias means further comprises a coil spring connecting said inside clamp panel to said outside clamp panel for biasing said inside clamp panel and said outside clamp panel against said cover sheet and the front door posts and window posts respectively.

16. The protective cover of claim 15 further comprising connecting means provided on one end of said cover sheet and receptacle means provided on said inside clamp panel of said at least one clamp for removably receiving said connecting means and removably joining said one end of said cover sheet to said inside clamp panel.

17. A protective cover for the windshield, passenger side windows, rear window and driver's side windows of a vehicle having front door posts and rear window posts, said protective cover comprising a flexible cover sheet for encircling the vehicle; a first clamp adapted for removably engaging one of the front door posts connecting means provided on one edge of said cover sheet and receptacle mans provided on said first clamp for removably receiving said connecting means and removably joining said one edge of said cover sheet to said first clamp and securing said one edge of said cover sheet to said one of the front door posts; leading edge means provided on said opposite edge of said cover sheet for engaging said first clamp and removably securing said opposite edge of said cover sheet to said first clamp; a second clamp adapted for engaging said cover sheet and the other of said front door posts in spaced relationship with respect to said first clamp for removably securing a first segment of said cover sheet against the windshield of the vehicle; a third clamp adapted for engaging said cover sheet and one of said rear window posts, in spaced relationship with respect to said second clamp for securing a second segment of said cover sheet over the passenger side windows of the vehicle; and a fourth clamp adapted for engaging said cover sheet and the other of said rear window posts in spaced relationship with respect to said third clamp for removably securing a third segment of said cove sheet against the rear window of the vehicle and wherein the fourth and last segment of said cover sheet extends from said fourth clamp against the driver's side windows to aid first clamp, with said opposite edge of said cover sheet secured to said one of the front door posts by said first clamp.

* * * * *